US010868808B1

(12) United States Patent
Hohler et al.

(10) Patent No.: US 10,868,808 B1
(45) Date of Patent: Dec. 15, 2020

(54) SERVER APPLICATION ACCESS AUTHENTICATION BASED ON SIM

(71) Applicant: Sprint Communications Company L.P., Overland Park, KS (US)

(72) Inventors: Ricky A. Hohler, Olathe, KS (US); Robin D. Katzer, Louisburg, KS (US); Deepthi Kota, Overland Park, KS (US); Brian D. Mauer, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 177 days.

(21) Appl. No.: 16/162,028

(22) Filed: Oct. 16, 2018

(51) Int. Cl.
| | | |
|---|---|---|
| *H04L 29/00* | (2006.01) |
| *H04L 29/06* | (2006.01) |
| *H04W 12/04* | (2009.01) |
| *H04W 12/08* | (2009.01) |
| *H04W 12/06* | (2009.01) |

(52) U.S. Cl.
CPC ......... *H04L 63/0853* (2013.01); *H04L 63/06* (2013.01); *H04L 63/0807* (2013.01); *H04W 12/04* (2013.01); *H04W 12/06* (2013.01); *H04W 12/08* (2013.01)

(58) Field of Classification Search
CPC ... H04L 63/10; H04L 63/0421; H04L 63/102; H04L 63/083
See application file for complete search history.

(56) References Cited

U.S. PATENT DOCUMENTS

| | | | | |
|---|---|---|---|---|
| 8,874,915 | B1* | 10/2014 | Rodoper | ............... H04L 9/0838 |
| | | | | 713/171 |
| 2015/0319156 | A1* | 11/2015 | Guccione | ............. H04W 12/06 |
| | | | | 726/7 |
| 2017/0093565 | A1* | 3/2017 | Yang | ...................... H04W 8/205 |
| 2018/0302781 | A1* | 10/2018 | Lee | ......................... H04W 8/20 |
| 2018/0351943 | A1* | 12/2018 | Yasukawa | ............. H04W 12/06 |
| 2019/0380019 | A1* | 12/2019 | Buckley | .............. H04L 12/1895 |

OTHER PUBLICATIONS

Hohler, Ricky A., et al., "Mobile Phone client Application Authentication Through Media Access Gateway (MAG)", U.S. Appl. No. 15/912,521, filed Mar. 5, 2018.
Hohler, Ricky A., et al., "Secondary Device Authentication Proxied from Authenticated Primary Device)", U.S. Appl. No. 16/363,581, filed Mar. 25, 2019.

* cited by examiner

*Primary Examiner* — Jeffrey C Pwu
*Assistant Examiner* — Helai Salehi

(57) ABSTRACT

A mobile communication device. The mobile communication device comprises a processor, a non-transitory memory, a subscriber identity module (SIM), wherein the SIM stores an encryption key, and a client application stored in the non-transitory memory. When executed by the processor, the client application transmits a server application authentication token request comprising an identity of the SIM, receives a message comprising a value, requests the SIM to encrypt the value using the encryption key stored by the SIM, receives an encrypted value from the SIM, transmits the encrypted value in a message, receives a server application authentication token, stores the server application authentication token in the non-transitory memory, transmits a server application access request comprising the server application authentication token, and conducts a communication session with the server application.

15 Claims, 8 Drawing Sheets

SERVER APPLICATION ACCESS AUTHENTICATION BASED ON SIM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may comprise a subscriber identity module (SIM) that securely stores authentication credentials for attaching to and communicating via a cellular wireless communication network. When a radio transceiver of the mobile communication device authenticates into a radio access network (RAN), it first obtains a copy of the authentication credentials from the SIM and then requests attachment to the RAN in a message comprising the authentication credentials. A SIM may be a removable smart card that comprises both non-volatile memory storing the authentication credentials and a logic processor able to execute instructions. The SIM may store one or more encryption key that is unique to this SIM and may provide encryption services to applications executing on the mobile communication device.

In some cases the mobile communication device comprises a SIM which is not removable (e.g., not removable by an ordinary user without damaging the mobile communication device), for example is connected to a motherboard of the mobile communication device. Such a SIM which is not removable may be referred to as an embedded universal integrated circuit card (UICC). An embedded UICC is substantially similar to a removable SIM in having non-volatile memory storing authentication credentials and one or more encryption key and having a logic processor.

SUMMARY

In an embodiment, a mobile communication device is disclosed. The mobile communication device comprises a processor, a non-transitory memory, a subscriber identity module (SIM), wherein the SIM stores an encryption key, and a client application stored in the non-transitory memory. When executed by the processor, the client application transmits a server application authentication token request comprising an identity of the SIM, receives a message comprising a value, and requests the SIM to encrypt the value using the encryption key stored by the SIM. The client application further receives an encrypted value from the SIM, transmits the encrypted value in a message, receives a server application authentication token, stores the server application authentication token in the non-transitory memory, transmits a server application access request comprising the server application authentication token, and conducts a communication session with the server application.

In another embodiment, a method of establishing a communication session with a server application executing on a computer system is disclosed. The method comprises transmitting a server application authentication token request message by a client application executing on a mobile communication device, where the server application authentication token request message comprises an identity of a SIM of the mobile communication device and receiving a message comprising a value by the client application. The method further comprises requesting the SIM to encrypt the received value by the client application, receiving an encrypted value by the client application from the SIM, and transmitting the encrypted value by the client application in a message. The method further comprises receiving a server application authentication token in a message by the client application, transmitting the server application authentication token in a server application access request message by the client application, and conducting a communication session with the server application by the client application.

In yet another embodiment, a method of authenticating a client application executing on a mobile communication device to access a server application executing on a computer system. The method comprises receiving a request for a server application authentication token from a mobile communication device by a device authentication server (DAS) application executing on a computer system, where the request comprises an identity of a SIM of the mobile communication device, reading information about a subscriber account from a data store based on the identity of the SIM by the DAS application, and generating a nonce value by the DAS application. The method further comprises transmitting the nonce value by the DAS application to the mobile communication device in a message, receiving a first encrypted value by the DAS application from the mobile communication device in a message, and creating a second encrypted value by the DAS application by encrypting the value using an encryption key associated with the SIM. The method further comprises comparing the first encrypted value to the second encrypted value by the DAS application, based on the first encrypted value matching the second encrypted value, generating a server application authentication token by the DAS application based on at least some of the information read from the subscriber account, and transmitting the server application authentication token by the DAS application to the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
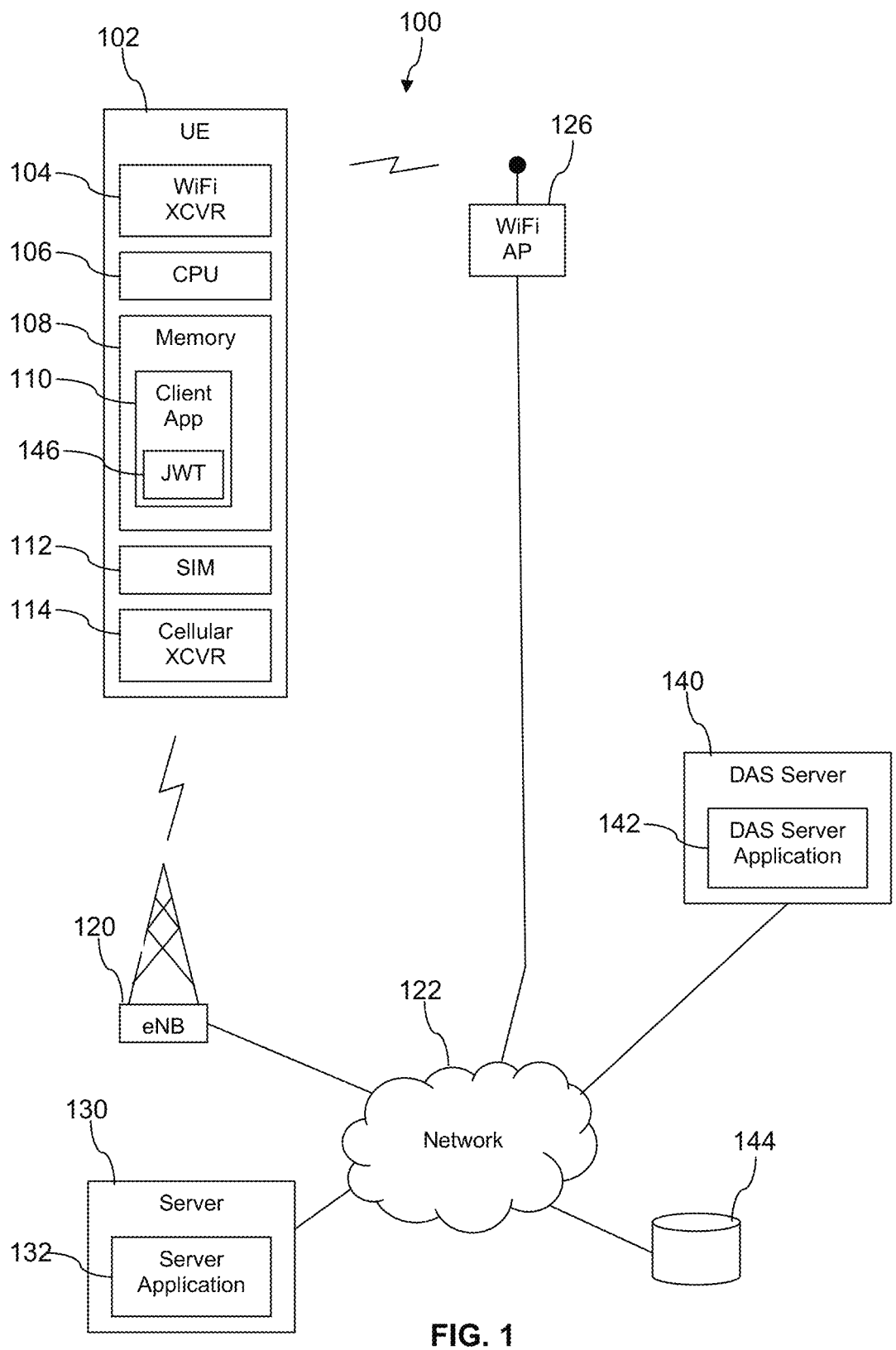
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system and method for authenticating access to a server application from a mobile communication device that leverages the features of the subscriber identity module (SIM) of the mobile communication device. This provides a first level of security which reduces the effectiveness of denial of service (DOS) type of cyber-attacks as well as foils robot attacks that repeatedly try to login with logins (userid and passwords) hacked from a different computer system (unfortunately, many computer users duplicate their userids and passwords on different computer systems, which is considered an insecure practice).

A client application installed on the mobile communication device is configured to first obtain an authentication token before requesting access to a server application corresponding to the client application. In an embodiment, the client application may be a wireless communication service account self-service client application, and the server application may be a self-service server application executing on a server computer. The self-service server application may allow a user of the client application to look at a balance of a wireless communication service account, to deposit funds into the account, to pay a bill via the account, to purchase and order a new mobile communication device, and to add a new premium communication service to the account.

The client application sends in a request for an authentication token to a device authentication server (DAS) application. The DAS application generates a random number or nonce and returns this nonce in a message to the client application. The client application requests the SIM of the mobile communication device to encrypt the nonce using an encryption key securely stored in the SIM. The client application sends the encrypted nonce as well as an identity of the SIM (e.g., an integrated circuit card ID (ICCID)) in a message to the DAS application. The DAS application looks up the encryption key associated with the SIM based on the ICCID included in the message from the client application. The DAS application encrypts the nonce using the looked-up encryption key. The DAS application compares the encrypted value it produced to the encrypted value received in the message from the client application. If the two encrypted values match, the DAS application deems the mobile communication device authenticated. In some cases, the DAS application may do further checks, for example verifying that the wireless communication service account associated with the ICCID is in good standing.

After authenticating the mobile communication device in the above described manner, the DAS application generates an authentication token that encrypts the ICCID and other wireless communication service account information. This encryption may be performed using an encryption key that is private to the DAS application. The DAS application may further encrypt a time-to-live value in the authentication token. The time-to-live value may indicate a date and time at which the authentication token will no longer be deemed valid. The DAS application transmits the authentication token to the client application. The client application stores the authentication token on the mobile communication device.

When the client application is invoked to access the corresponding server application (e.g., a user launches the self-service client to perform self-service actions on his or her wireless communication service account), the client application retrieves the authentication token, obtains the ICCID from the SIM, and transmits an access request message comprising the ICCID and the authentication token to the server application. The server application requests the DAS application to validate the authentication token and provides the DAS application the ICCID and the authentication token. The DAS application decrypts the authentication token. The DAS application confirms that the time-to-live of the authentication token has not expired. The DAS application confirms that the ICCID value sent in the request message matches the ICCID value stored in the encrypted authentication token. The DAS application may further confirm that the wireless communication service account associated with the ICCID is still valid and/or is in good standing. If all the checks succeed, the DAS application informs the server application that the client application and/or the mobile communication device has passed authentication. The server application may then grant access to the application programming interface (API) to the client application in a communication session. Alternatively, the server application may challenge the client application to enter a userid and password.

In an embodiment, the access request message sent by the client application is routed directly to the DAS application instead of to the server application. This alternative routing of the access request message can avoid the server application being burdened with requests that may not be authenticated. Further, this alternative routing of the access request messages may reduce the effectiveness of DOS attacks.

When the authentication token time-to-live has expired, the DAS application rejects the access request message received from the client application. In an embodiment the DAS application may provide a reason in the access denial message, for example "invalid authentication token." If the client application has its access request rejected, particularly if it is informed of an "invalid authentication token" rejection reason, it may discard or destroy the stored authentication token and request a new authentication token following the process described above. In an embodiment, the SIM is an embedded universal integrated circuit card (UICC). Said in another way, a UICC is a special case of an embedded SIM versus a modular removable SIM, but the UICC is still a SIM.

When a new SIM is installed in the mobile communication device, the client application may be informed that a new SIM has been installed, may discard or destroy the stored authentication token, and request a new authentication token following the process described above, wherein the client application provides the ICCID of the newly installed SIM. Note that embedded UICCs are not typically removable and replaceable by users, and hence this description of detecting a new SIM and replacing the authentication token does not apply to SIMs that are UICCs.

Turning now to FIG. 1, a communication system 100 is described. In an embodiment, the system 100 comprises a mobile communication device (user equipment—UE) 102 that comprises an optional WiFi radio transceiver 104, a processor 106, a memory 108, a subscriber identity module (SIM) 112, and a cellular radio transceiver 114. The memory 108 comprises a non-transitory memory portion that stores a client application 110. The mobile communication device 102 is one of a mobile phone, a smart phone, a personal digital assistant (PDA), a wearable computer, a headset computer, a laptop computer, a tablet computer, or a notebook computer. In an embodiment, the SIM 112 is an embedded universal integrated circuit card (UICC).

The system 100 further comprises a cell site 120 and a network 122. The cell site 120 is configured to establish a wireless communication link with the cellular radio transceiver 114 of the mobile communication device 102 according to a long term evolution (LTE), a code division multiple access (CDMA), a global system for mobile communications (GSM), or a worldwide interoperability for microwave access (WiMAX) wireless communication protocol. The network 122 may be one or more private networks, one or more public networks, or a combination thereof. The cell site 120 provides communication connectivity to the network 122 to the wireless communication device 102. In an embodiment, the system 100 further comprises a WiFi access point 126 that is configured to establish a wireless communication link with the WiFi radio transceiver 104 of the wireless communication device 102 and to provide communication connectivity to the network 122 to the wireless communication device 102.

The system 100 further comprises a server 130 that executes a server application 132, a device authentication server (DAS) server 140 that executes a DAS application 142, and a data store 144. The server 130 and the DAS server 140 may be implemented as computer systems. The data store 144 may be implemented, at least in part, as a computer system. Computer systems are described further hereinafter. The server 130, the DAS server 140, and the data store 144 are each communicatively coupled to the network 122. The system 100 may comprise any number of mobile communication devices 102, any number of cell sites 120, any number of WiFi access points 126, and any number of servers 130.

The client application 110 may request communication connectivity to the server application 132 to access services provided by the server application 132, for example to access an application programming interface (API) extended by the server application 132. To access the server application 132, the client application 110 may request and receive an authentication token from the DAS server application 142. The client application 110 may then send an access request to the server application 132 containing the authentication token. Alternatively, the client application 110 may send the authentication token to the DAS server 140, the DAS server application 142 may validate the authentication token, and the DAS server application 142 may then proxy the access request from the client application 110 to the server 130 and the server application 132. In an embodiment, the authentication token is provided as a JSON web token (JWT) 146 that is stored in the non-volatile portion of the memory 108. In an embodiment, the JWT 146 is stored in a secure partition of the non-volatile portion of the memory 108, for example in a trust zone of the memory 108 or in a trust zone of the processor 106.

While FIG. 1 illustrates a single client application 110 having an authentication token 146, it is understood that the client application authentication based on SIM idea can advantageously be applied by multiple different client applications installed on the same mobile communication device 102 at the same time. Each different client application can obtain its own distinct authentication token for validating by the DAS server application 142 before proxying the access request to the subject server and server application. It is observed that the client application 110 can communicatively couple to the network 122 and to the server 130 either through a wireless link established by the cell site 120 or through a wireless link established by the WiFi access point 126.

Figure 2:
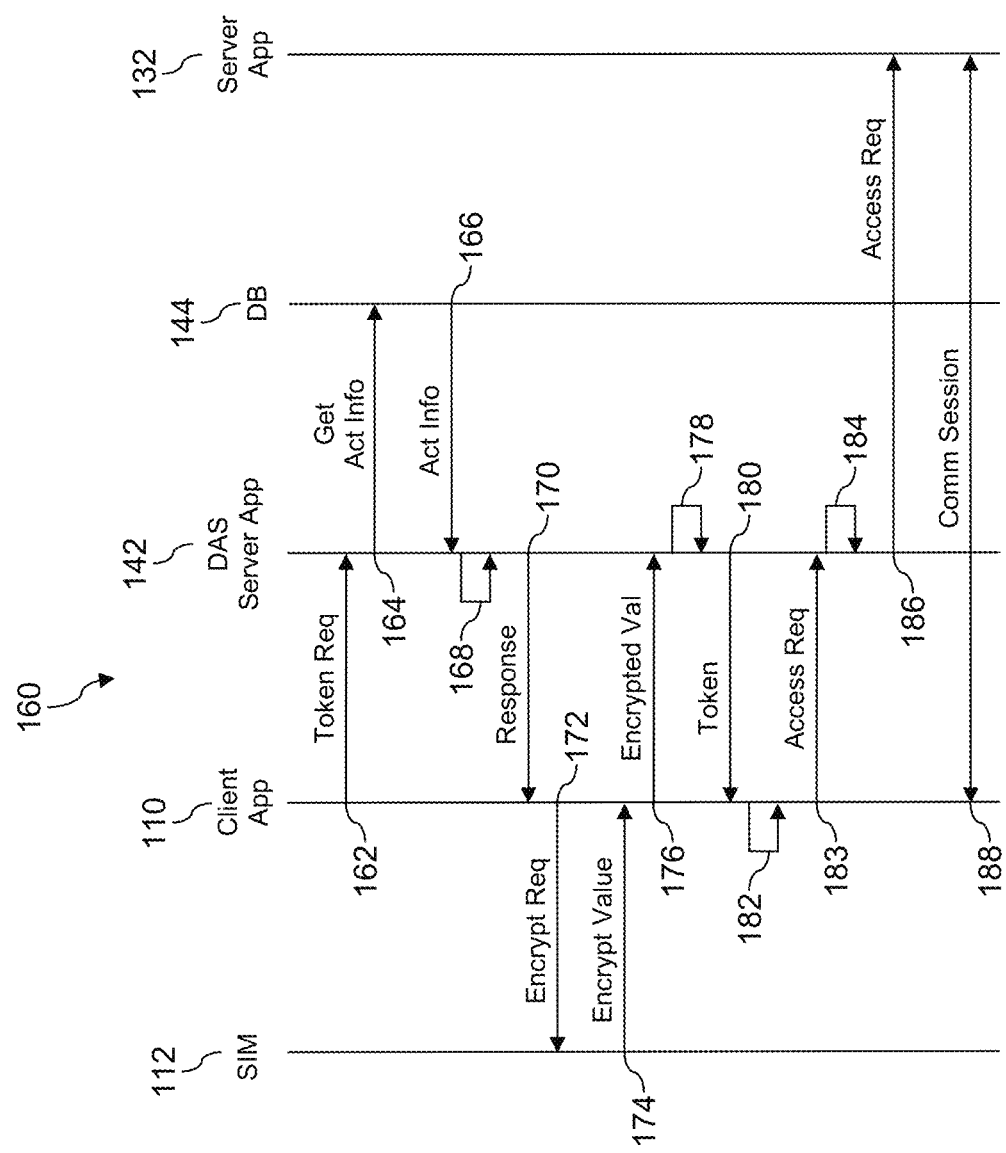
FIG. 2 is a message sequence diagram according to an embodiment of the disclosure.

Turning now to FIG. 2, a message sequence diagram 160 is described. The client application 110 sends an authentication token request message 162 to the DAS server application 142. The authentication token request message 162 comprises an integrated circuit card identity (ICCID) of the SIM 112 associated with the mobile communication device 102. The DAS server application 142 sends a get account information request message 164 to the data store 144 including the ICCID provided by the client application 110 for use as a search key. The data store 144 returns the account information associated with the ICCID in a message 166 to the DAS server application 142, including a private encryption key associated with the SIM 112. If the data store 144 finds account information associated with the ICCID, it returns a message 166 containing account information to the DAS server application 142. If the data store 144 does not find the ICCID provided by the client application 110, it returns an error message to the DAS server application 142.

At label 168, the DAS server application 142 evaluates the message 166 received from the data store 144. If the wireless subscription account associated with the ICCID provided by the client application 110 is invalid, closed, or not in good standing, the DAS server application 142 may return an error message to the client application 110. If the evaluation at label 168 succeeds, the DAS server application 142 generates a random value or nonce, and sends the nonce in a response message 170 to the client application 110. The client application 110 sends a request message 172 containing the nonce it received from the DAS server application 142 and requesting the SIM 112 to encrypt the nonce using a private encryption key of the SIM 112. The SIM 112 returns the encrypted nonce in a message 174 to the client application 110. The client application 110 sends the encrypted nonce in a message 176 to the DAS server application 142.

At label 178, the DAS server application 142 encrypts the nonce using the encryption key associated with the SIM 112 that was returned to it by the data store 144. The DAS server application 142 compares the encrypted nonce value received from the client application 110 to the encrypted nonce value that it determined based on the encryption key looked-up from the data store 144. If the encrypted nonce values match, the client application 110 is deemed authenticated, but otherwise deemed unauthenticated.

If the client application 110 is deemed authenticated, the DAS server application constructs an authentication token that comprises an encrypted value determined by the DAS server application 142 based on encrypting the ICCID of the SIM 112, encrypting a time-to-live value, and optionally encrypting additional information about the wireless communication subscription account associated with the SIM 112. For example, the encrypted value determined by the DAS server application 142 may comprise an encryption of an identity of the mobile communication device 102 such as an international mobile equipment identity (IMEI). In constructing the authentication token, the DAS server application 142 may perform the encryption operation using a private key belonging to the DAS server application 142. The DAS server application 142 sends the authentication token in a message 180 to the client application 110. At label 182, the client application 110 stores the authentication token in the non-volatile portion of the memory 108. In an embodiment, the client application 110 stores the authentication token in a trust zone of the memory 108 or of the processor 106.

At some later time, the client application 110 may desire to access services provided by the server application 132. The client application 110 at label 182 looks up the ICCID of the SIM 112, looks up the authentication token from the memory 108, makes a copy of the authentication token, and sends the copy of the authentication token and the ICCID in an access request message 183 to the DAS server application 142. The ICCID may be provided in a header portion of the message 183, and the copy of the authentication token may be provided in a body portion of the message 183. At label 184, the DAS server application 142 validates the authentication token received from the client application 110. In an embodiment, the DAS server application 142 decrypts the encrypted portion of the authentication token. The DAS server application 142 compares the ICCID value it decrypted from the authentication token to the ICCID value that was sent in the message outside of the authentication token. The DAS server application 142 determines if the time-to-live value it decrypted is valid. The DAS server application 142 determines if the wireless communication service account associated with the ICCID is valid and in good standing. If all these checks are passed successfully, the DAS server application 142 sends the access request message 186 to the server application 132. The access request message 186 may be considered a proxy access request message. The access request message 186 does not include the authentication token. The server application 132 may challenge the client application 110 to provide a matching userid and password. If the userid and password are verified by the server application 132, it may establish a communication session 188 with the client application 110.

In an embodiment, the communications between the client application 110, the DAS server application 142, and the server application 132 are conducted via HTTPS (Hypertext Transfer Protocol Secure) and using the transport layer security (TLS) for these communications.

Figure 3:
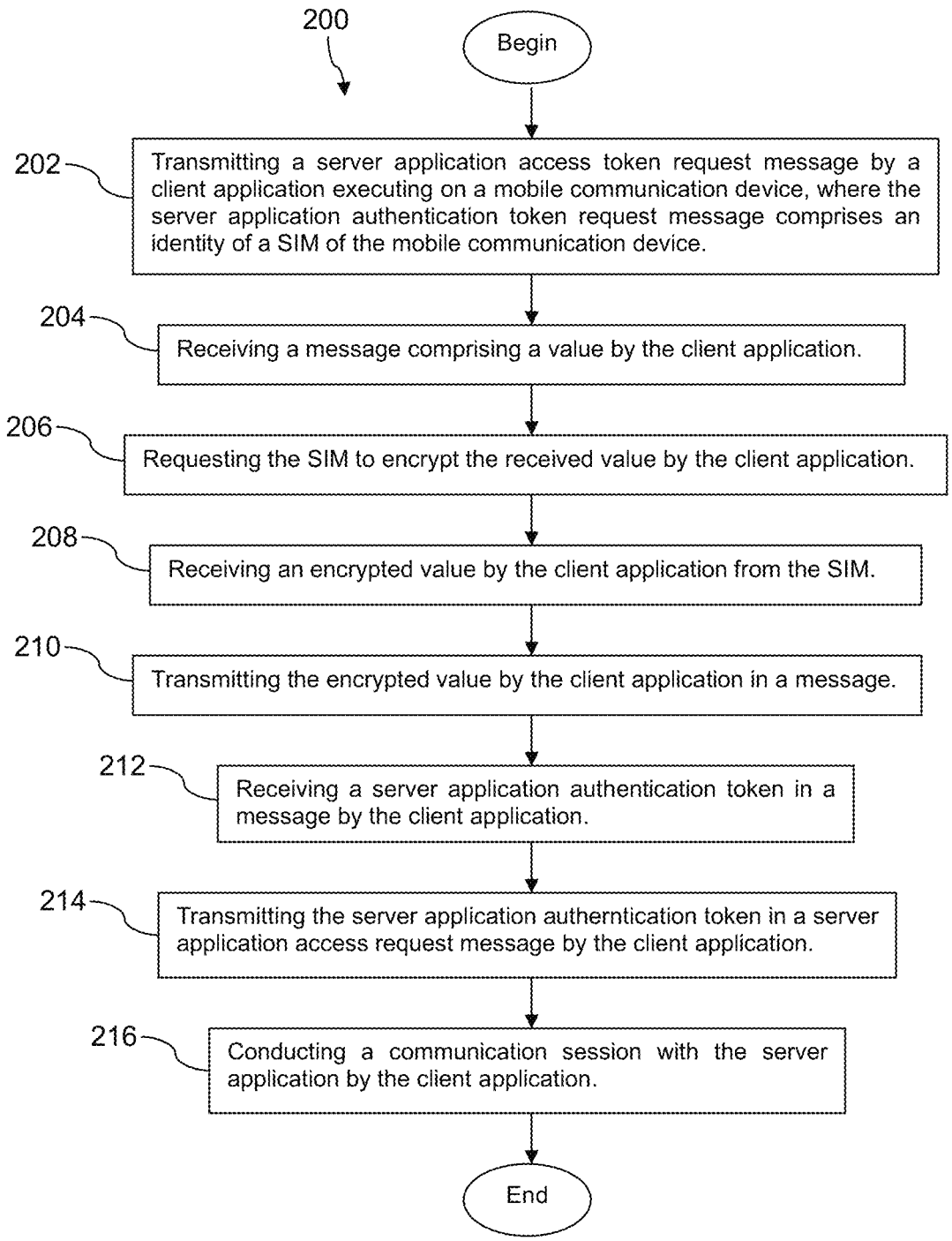
FIG. 3 is a flow chart of a method according to an embodiment of the disclosure.

Turning now to FIG. 3, a method 200 is described. Method 200 is a method of establishing a communication session with a server application executing on a computer system At block 202, the method 200 comprises transmitting a server application authentication token request message by a client application executing on a mobile communication device, where the server application authentication token request message comprises an identity of a SIM of the mobile communication device. At block 204, the method 200 comprises receiving a message comprising a value by the client application. At block 206, the method 200 comprises requesting the SIM to encrypt the received value by the client application. At block 208, the method 200 comprises receiving an encrypted value by the client application from the SIM.

At block 210, the method 200 comprises transmitting the encrypted value by the client application in a message. At block 212, the method 200 comprises receiving a server application authentication token in a message by the client application. The client application may store the server application authentication token in memory of the mobile communication device or in a trust zone of the processor of the mobile communication device. At block 214, the method 200 comprises transmitting the server application authentication token in a server application access request message by the client application. The server application access request message may further comprise an identity of the SIM, for example a ICCID of the SIM. At block 216, the method 200 comprises conducting a communication session with the server application by the client application.

If the SIM 112 is removable and is replaced, the operating system of the mobile communication device 102 may notify the client application 110 of this change. The client application 110 in response may delete or mark as invalid the existing authentication token 146 stored in the memory 108 or in the trust zone. The client application 110 may then obtain a new authentication token, based on the ICCID of the new SIM 112, following the process described above with reference to processing blocks 202, 204, 206, 208, 210, and 212.

Figure 4:
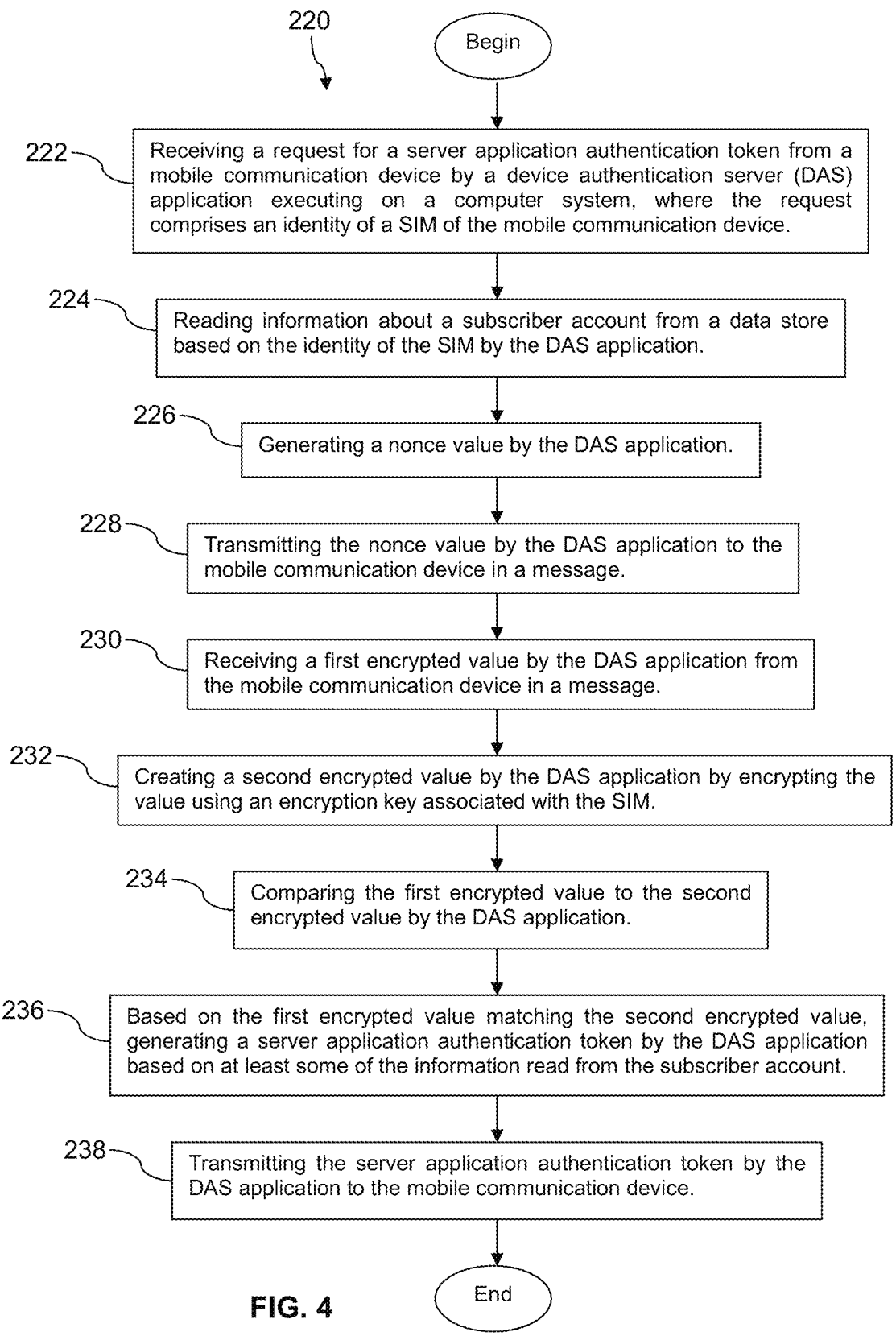
FIG. 4 is a flow chart of another method according to an embodiment of the disclosure.

Turning now to FIG. 4, a method 220 is described. Method 220 is a method of authenticating a client application executing on a mobile communication device to access a server application executing on a computer system At block 222, the method 220 comprises receiving a request for a server application authentication token from a mobile communication device by a device authentication server (DAS) application executing on a computer system, where the request comprises an identity of a SIM of the mobile communication device. At block 224, the method 220 comprises reading information about a subscriber account from a data store based on the identity of the SIM by the DAS application. At block 226, the method 220 comprises generating a nonce value by the DAS application.

At block 228, the method 220 comprises transmitting the nonce value by the DAS application to the mobile communication device in a message. At block 230, the method 220 comprises receiving a first encrypted value by the DAS application from the mobile communication device in a message. At block 232, the method 220 comprises creating a second encrypted value by the DAS application by encrypting the value using an encryption key associated with the SIM.

At block 234, the method 220 comprises comparing the first encrypted value to the second encrypted value by the DAS application. At block 236, the method 220 comprises, based on the first encrypted value matching the second encrypted value, generating a server application authentication token by the DAS application based on at least some of the information read from the subscriber account. At block 238, the method 220 comprises transmitting the server application authentication token by the DAS application to the mobile communication device.

In an embodiment, method 220 further comprises receiving an access request from a mobile communication device by the DAS application, wherein the access request comprises an identity of a SIM and the authentication token and decrypting the authentication token by the DAS application. In a first example, the method 220 comprises determining by the DAS application that the identity of the SIM in the access request matches an identity of a SIM decrypted from the authentication token and informing the server application that the mobile communication device has passed authentication, whereby the mobile communication device accesses server application. In a second example, the method 220 comprises determining by the DAS application that the identity of the SIM in the access request does not match an identity of a SIM decrypted from the authentication token and dropping the access request from the mobile communication device by the DAS application and not informing the server application of the request, whereby a denial of service (DOS) attack is prevented from reaching the server application.

Figure 5:
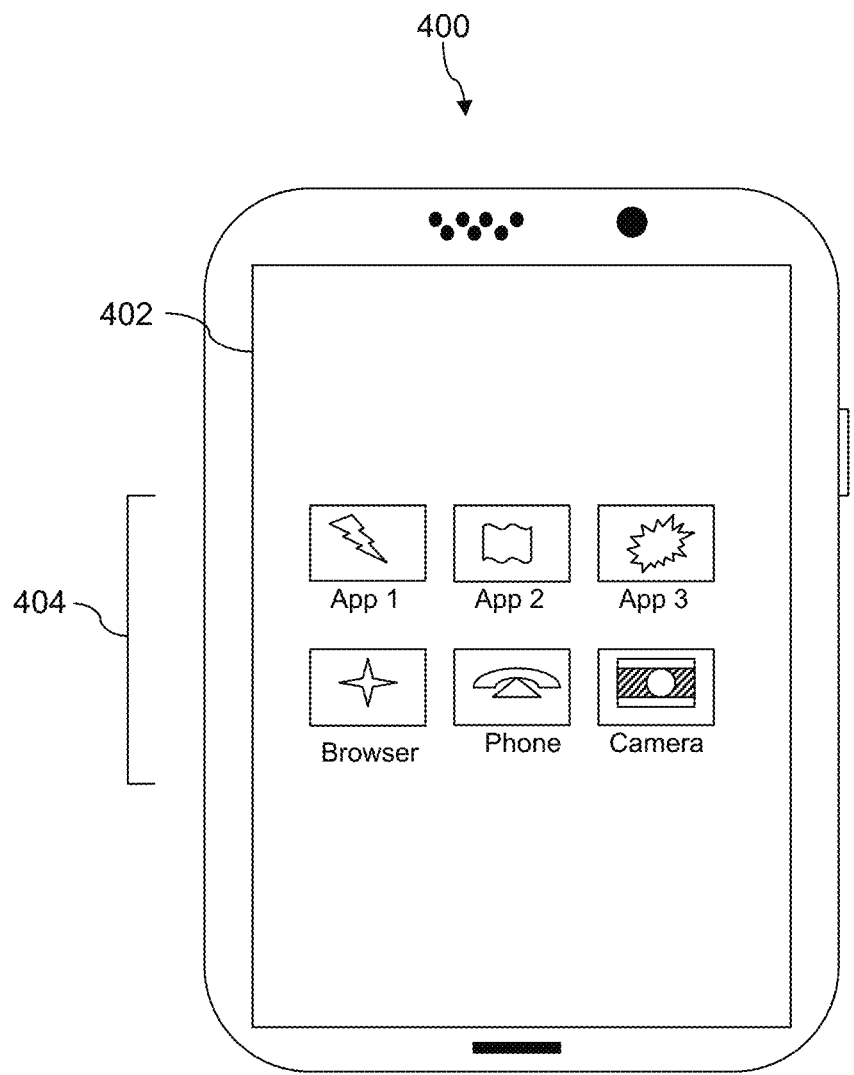
FIG. 5 is an illustration of a mobile communication device according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
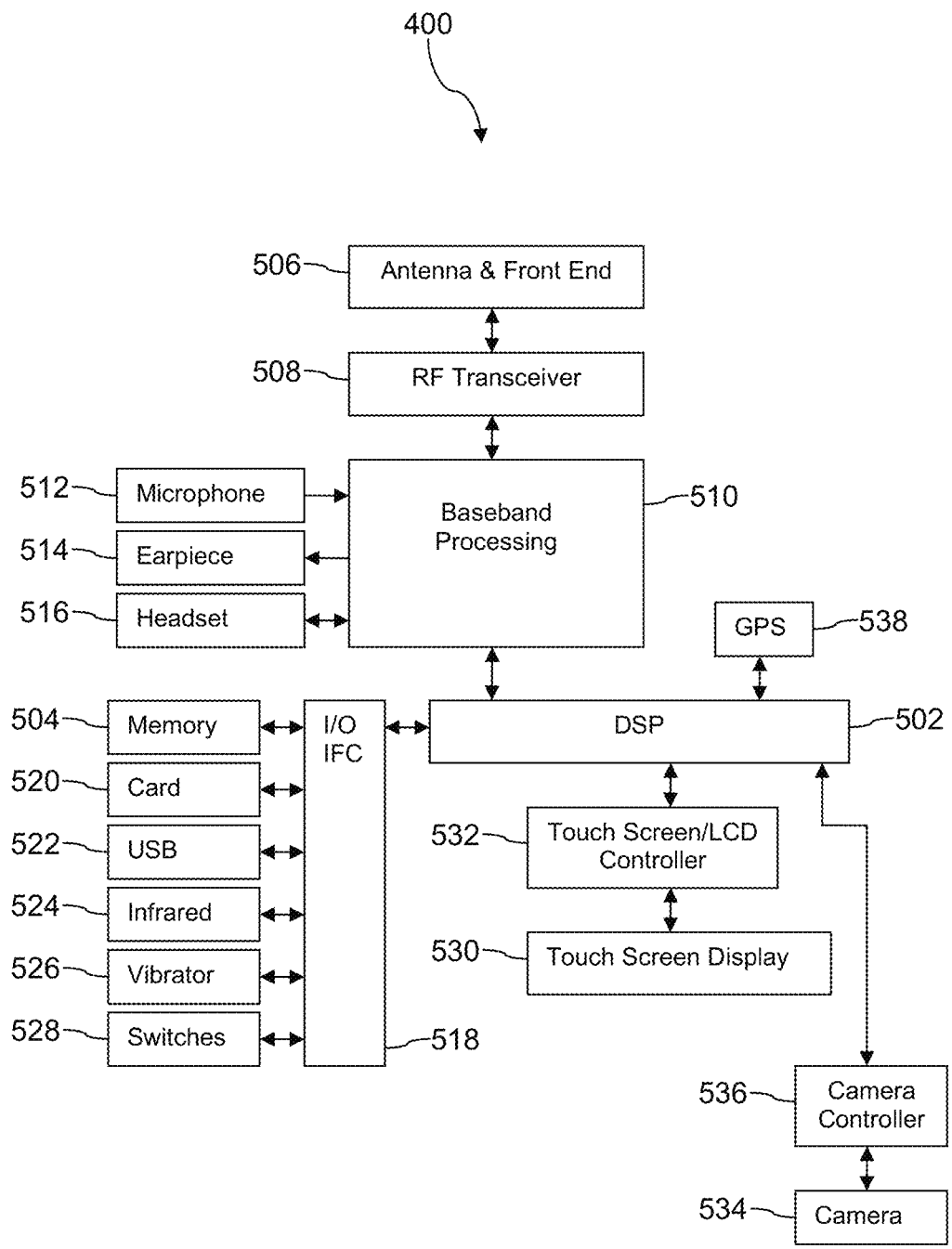
FIG. 6 is a block diagram of a hardware architecture of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
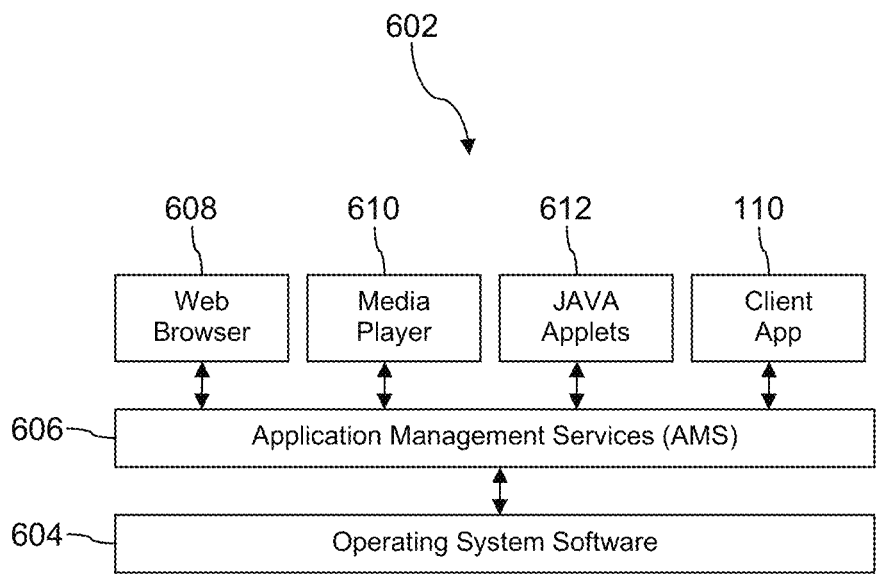
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, JAVA applets 612, and the client application 110 described above with reference to FIG. 1. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
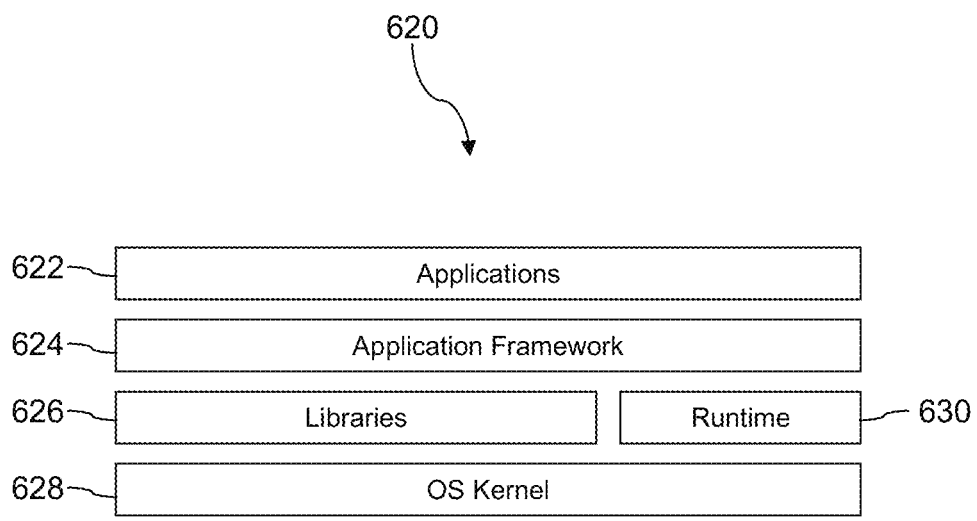
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
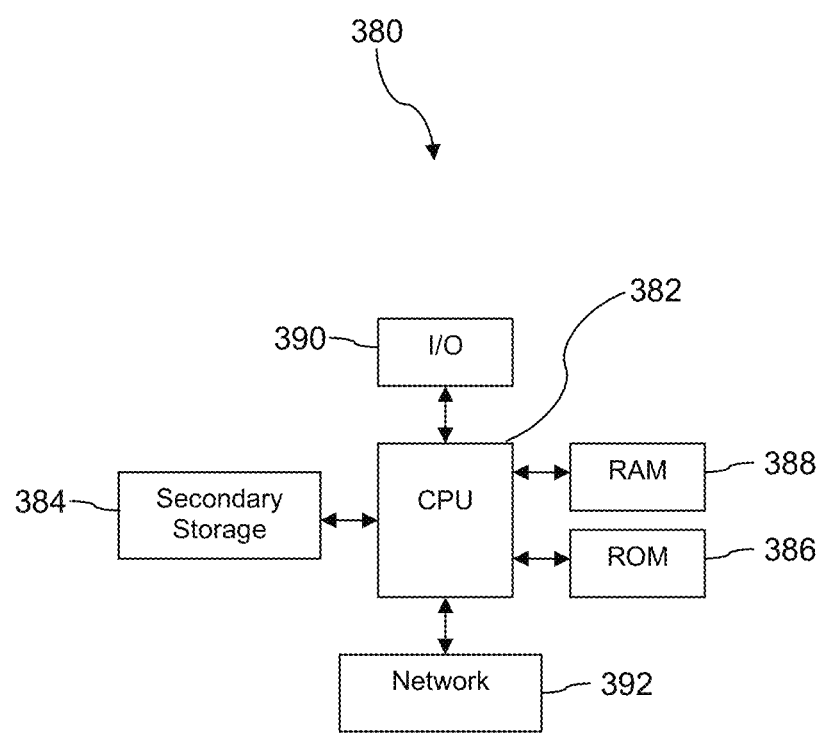
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating a client application executing on a mobile communication device to access a server application executing on a computer system, comprising:

receiving a request for a server application authentication token from a mobile communication device by a device authentication server (DAS) application executing on a computer system, where the request comprises an identity of a SIM of the mobile communication device;

reading information about a subscriber account from a data store based on the identity of the SIM by the DAS application;

generating a nonce value by the DAS application;

transmitting the nonce value by the DAS application to the mobile communication device in a message;

receiving a first encrypted value by the DAS application from the mobile communication device in a message, wherein the first encrypted value is created by the SIM of the mobile communication device encrypting the nonce value using an encryption key stored in the SIM;

looking up an encryption key associated with the SIM in the data store based on an identity of the SIM included in the message from the mobile communication device;

creating a second encrypted value by the DAS application by encrypting the value using the looked-up encryption key associated with the SIM;

comparing the first encrypted value to the second encrypted value by the DAS application;

based on the first encrypted value matching the second encrypted value, generating a server application authentication token by the DAS application based on at least some of the information read from the subscriber account, wherein the server application authentication token is generated at least in part by encrypting the identity of the SIM of the mobile communication device;

transmitting the server application authentication token by the DAS application to the mobile communication device;

receiving an access request from the mobile communication device by the DAS application, wherein the access request comprises an identity of a SIM and the server application authentication token;

decrypting the server application authentication token by the DAS application;

determining by the DAS application that the identity of the SIM in the access request matches the identity of the SIM decrypted from the server application authentication token; and informing the server application that the mobile communication device has passed authentication, whereby the mobile communication device accesses the server application.

2. The method of claim 1, wherein the DAS application builds a time-to-live value into the server application authentication token.

3. The method of claim 1, wherein the server application authentication token is a JSON web token (JWT).

4. The method of claim 1, wherein the DAS application generates the server application authentication token at least in part by encrypting some of the information read from the subscriber account.

5. The method of claim 1, further comprising:

receiving a second access request from a second mobile communication device by the DAS application, wherein the access request from the second mobile communication device comprises an identity of a SIM and a second authentication token, and wherein the second authentication token is generated at least in part by encrypting an identity of a SIM of the second mobile communication device;

decrypting the second authentication token by the DAS application;

determining by the DAS application that the identity of the SIM in the second access request does not match the identity of the SIM decrypted from the second authentication token; and dropping the second access request from the second mobile communication device by the DAS application and not informing the server application of the request, whereby a denial of service (DOS) attack is prevented from reaching the server application.

6. The mobile communication device of claim 1, wherein the server application authentication token comprises further encrypted information including a time-to-live value.

7. A method of establishing a communication session with a server application executing on a computer system, comprising:

transmitting a server application authentication token request message by a client application executing on a mobile communication device, where the server application authentication token request message comprises an identity of a SIM of the mobile communication device;

receiving a message comprising a value by the client application from a device authentication server (DAS) application executing on a computer system;

requesting the SIM to encrypt the received value by the client application, wherein the SIM encrypts the received value using an encryption key stored in the SIM to create a first encrypted value;

receiving the first encrypted value by the client application from the SIM;

transmitting the first encrypted value and the identity of the SIM by the client application in a message to the DAS application;

receiving a server application authentication token in a message by the client application based on the DAS application determining that the first encrypted value matches a second encrypted value created by the DAS application encrypting the value using an encryption key associated with the SIM looked up in a data store based on the identity of the SIM, wherein the server application authentication token is generated at least in part by encrypting the identity of the SIM of the mobile communication device;

transmitting the server application authentication token and an identity of a SIM in a server application access request message by the client application to the DAS application, wherein the DAS application decrypts the server application authentication token, determines that the identity of the SIM in the server application access request matches the identity of the SIM decrypted from the server application authentication token, and informs the server application that the mobile communication device passed authentication; and conducting a communication session with the server application by the client application.

8. The method of claim 7, wherein the client application is a wireless communication service account self-service client application and the server application is a corresponding wireless communication service account self-service server application.

9. The method of claim 7, wherein the transmitting and receiving are performed via Hypertext Transfer Protocol Secure (HTTPS) using transport layer security (TLS).

10. The method of claim 7, further comprising:

receiving by the client application notification from the mobile communication device that a new SIM was installed in the mobile communication device;

deleting the server application authentication token from a memory of the mobile communication device; and transmitting a second server application authentication token request message by the client application, where the second server application authentication token request message comprises an identity of the new SIM.

11. A mobile communication device, comprising:

a processor;

a non-transitory memory;

a subscriber identity module (SIM), wherein the SIM stores an encryption key;

a client application stored in the non-transitory memory that, when executed by the processor:

transmits a server application authentication token request comprising an identity of the SIM, receives a message comprising a value from a device authentication server (DAS) application executing on a computer system, requests the SIM to encrypt the value using the encryption key stored by the SIM, wherein the SIM encrypts the received value using the encryption key stored in the SIM to create a first encrypted value, receives the first encrypted value from the SIM, transmits the first encrypted value and the identity of the SIM in a message to the DAS application, receives a server application authentication token based on the DAS application determining that the first encrypted value matches a second encrypted value created by the DAS application encrypting the value using an encryption key associated with the SIM looked up in a data store based on the identity of the SIM, wherein the server application authentication token is generated at least in part by encrypting the identity of the SIM of the mobile communication device, stores the server application authentication token in the non-transitory memory, transmits a server application access request comprising the server application authentication token and an identity of a SIM to the DAS application, wherein the DAS application decrypts the server application authentication token, determines that the identity of the SIM in the server application access request matches the identity of the SIM decrypted from the server application authentication token, and informs the server application that the mobile communication device passed authentication, and conducts a communication session with the server application.

12. The mobile communication device of claim 11, wherein the server application authentication token is a JSON web token (JWT).

13. The mobile communication device of claim 11, wherein the SIM is an embedded universal integrated circuit card (UICC).

14. The mobile communication device of claim 11, wherein the SIM is a removable SIM.

15. The mobile communication device of claim 11, wherein the mobile communication device is one of a mobile phone, a smart phone, a personal digital assistant (PDA), a wearable computer, a headset computer, a laptop computer, a tablet computer, or a notebook computer.

* * * * *